US009053615B2

(12) United States Patent
Jones et al.

(10) Patent No.: US 9,053,615 B2
(45) Date of Patent: Jun. 9, 2015

(54) METHOD AND APPARATUS PERTAINING TO USE OF BOTH OPTICAL AND ELECTRONIC PRODUCT CODES

(71) Applicant: Wal-Mart Stores, Inc., Bentonville, AR (US)

(72) Inventors: Nicholaus A. Jones, Fayetteville, AR (US); Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 141 days.

(21) Appl. No.: 13/804,653

(22) Filed: Mar. 14, 2013

(65) Prior Publication Data

US 2014/0263603 A1    Sep. 18, 2014

(51) Int. Cl.
*G06F 17/00* (2006.01)
*G07G 1/00* (2006.01)
*G06Q 10/00* (2012.01)

(52) U.S. Cl.
CPC . *G07G 1/00* (2013.01); *G06Q 10/00* (2013.01)

(58) Field of Classification Search
CPC . G06K 19/06009; G06K 19/14; G06K 19/16; G06K 19/18; G06K 7/1096; G06K 7/12; G06K 19/06028; G06K 19/08; G06K 1/18; G06K 7/10554; G06K 7/10722; G06K 7/10821; G06K 7/14; G07G 1/0045; G07G 1/0018; G07G 1/0036; G07G 3/003
USPC .................. 235/375, 381, 383, 385, 380, 492
See application file for complete search history.

(56) References Cited

U.S. PATENT DOCUMENTS

| | | |
|---|---|---|
| 5,965,861 A | 10/1999 | Addy |
| 6,056,087 A | 5/2000 | Addy |
| 6,105,867 A | 8/2000 | Shimizu |
| 6,386,448 B1 | 5/2002 | Addy |
| 6,497,361 B1 | 12/2002 | Mason |
| 7,005,988 B2 | 2/2006 | Mathewson, II |
| 7,012,528 B2 | 3/2006 | Mathewson, II |
| 7,044,370 B2 | 5/2006 | Bellis, Jr. |
| 7,240,824 B2 | 7/2007 | Stockton |
| 7,275,690 B1 | 10/2007 | White |
| 7,337,962 B2 | 3/2008 | Do |
| 7,387,241 B2 | 6/2008 | Hassenbuerger |

(Continued)

FOREIGN PATENT DOCUMENTS

| | | |
|---|---|---|
| EP | 1736945 | 12/2006 |
| GB | 2307575 | 5/1997 |
| WO | 2009062019 | 5/2009 |

OTHER PUBLICATIONS

U.S. Appl. No. 14/301,225, filed Jun. 10, 2014, Lewis.

(Continued)

*Primary Examiner* — Thien M Le
(74) *Attorney, Agent, or Firm* — Fitch, Even, Tabin & Flannery, LLP

(57) ABSTRACT

A control circuit accesses information regarding both scanned optical product codes as correspond to items being purchased in a given transaction as well as read electronic product codes as correspond to items being purchased in that same transaction. The control circuit then compares that information to identify discrepancies. An example of a discrepancy of likely interest includes noting items for which there is a read electronic product code but not a corresponding scanned optical product code and vice versa.

14 Claims, 3 Drawing Sheets

(56) References Cited

U.S. PATENT DOCUMENTS

| | | |
|---|---|---|
| 7,416,119 B1 | 8/2008 | Inderrieden |
| 7,744,130 B2 * | 6/2010 | Zazzu et al. ............... 283/72 |
| 7,997,486 B2 | 8/2011 | Ulrich |
| 8,239,677 B2 | 8/2012 | Colson |
| 8,267,316 B2 | 9/2012 | Ostrowski |
| 8,275,664 B2 | 9/2012 | Ramsdale |
| 8,360,207 B1 | 1/2013 | Goodwin, III |
| 8,669,915 B2 | 3/2014 | Wilkinson |
| 8,781,908 B2 | 7/2014 | Lewis |
| 2003/0102373 A1 | 6/2003 | Swartz |
| 2004/0118916 A1 | 6/2004 | He |
| 2005/0173527 A1 | 8/2005 | Conzola |
| 2006/0015532 A1 | 1/2006 | Mizell |
| 2006/0107307 A1 | 5/2006 | Knox |
| 2007/0034692 A1 | 2/2007 | Johnson |
| 2007/0102513 A1 * | 5/2007 | Scheb ............... 235/383 |
| 2008/0218313 A1 | 9/2008 | dHont |
| 2009/0125406 A1 | 5/2009 | Lewis |
| 2009/0219159 A1 * | 9/2009 | Morgenstern ............... 340/573.1 |
| 2010/0140351 A1 * | 6/2010 | Trenciansky ............... 235/383 |
| 2012/0086553 A1 | 4/2012 | Wilkinson |
| 2013/0015242 A1 * | 1/2013 | White ............... 235/383 |
| 2013/0018715 A1 | 1/2013 | Zhou |
| 2013/0311230 A1 | 11/2013 | Kellstrand |
| 2013/0328682 A1 * | 12/2013 | Shearin et al. ............... 340/572.3 |

OTHER PUBLICATIONS

EPCglobal; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.

PCT; App. No. PCT/US2014/026490; International Search Report mailed Aug. 4, 2014.

PCT; App. No. PCT/US2014/026490; Written Opinion mailed Aug. 4, 2014.

* cited by examiner

_US 9,053,615 B2_

METHOD AND APPARATUS PERTAINING TO USE OF BOTH OPTICAL AND ELECTRONIC PRODUCT CODES

TECHNICAL FIELD

This disclosure relates generally to the reading of radio-frequency identification (RFID) tags.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

Being able to read and then uniquely identify each item within a manufacturing facility, a cargo container, a staging area, or in a retail display area offers any number of useful opportunities. One such opportunity includes facilitating the check-out process by which a customer purchases items (often at a so-called point-of-sale (POS) station) prior to removing those items from the retail facility. Unfortunately, actual fielded results in these regards greatly lags corresponding hopes for speedier, more-accurate, less-costly purchasing procedures. These disappointing results are owing at least in part to concerns and even mistrust on the part of both the potential purchaser and the seller regarding the accuracy of an RFID tag-based purchasing paradigm.

BRIEF DESCRIPTION OF THE DRAWINGS

The above needs are at least partially met through provision of the method and apparatus pertaining to use of both optical and electronic product codes described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments a control circuit accesses information regarding both scanned optical product codes as correspond to items being purchased in a given transaction as well as read electronic product codes as correspond to items being purchased in that same transaction. The control circuit then compares that information to identify discrepancies. An example of a discrepancy of likely interest includes noting items for which there is a read electronic product code but not a corresponding scanned optical product code and vice versa.

These teachings are highly flexible in practice and will accommodate a wide variety of approaches and alterations. The scanned optical product code information, for example, can be gleaned in one approach from a check-out station optical product code scanner. By another approach, in lieu of the foregoing or in combination therewith, the scanned optical product code information can be obtained from a customer's mobile optical product code scanner. The read electronic product code information, on the other hand, can be gleaned in one case by a check-out station radio-frequency identification tag scanner (or scanners) and/or by use of one or more overhead radio-frequency identification tag scanners as desired.

Using both optical product codes and electronic product codes (to the extent possible) for all items being purchased in a given, single purchasing transaction by a given customer can provide a variety of benefits. In some cases, for example, the customer can develop, at least over time, a sense of comfort and confidence that the electronic product code approach accurately captures their purchases and does not inappropriately, for example, result in their being charged for items that they did not, in fact, purchase.

Figure 1:
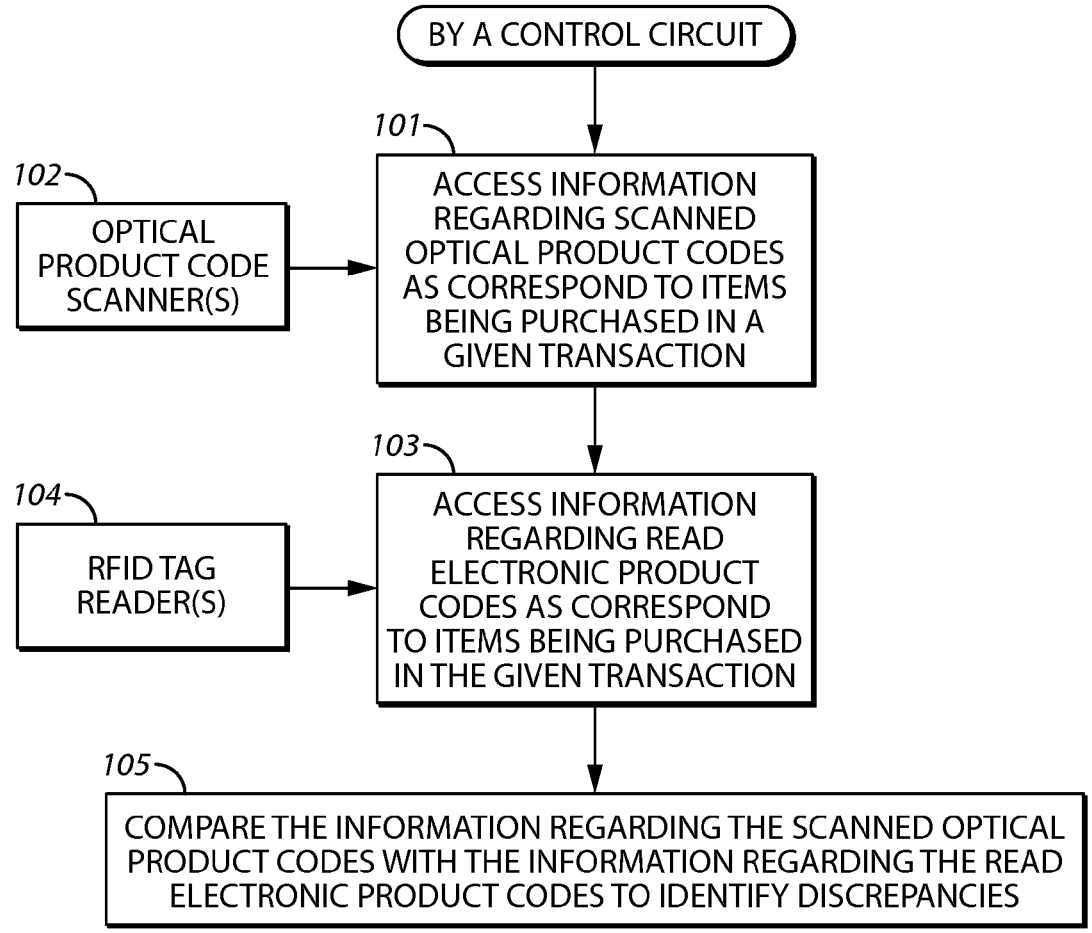
FIG. 1 comprises a flow diagram as configured in accordance with various embodiments of this disclosure.

These and other benefits may become clearer upon making a thorough review and study of the following detailed description. Referring now to the drawings, and in particular to FIG. 1, an illustrative process 100 that is compatible with many of these teachings will now be presented.

Figure 2:
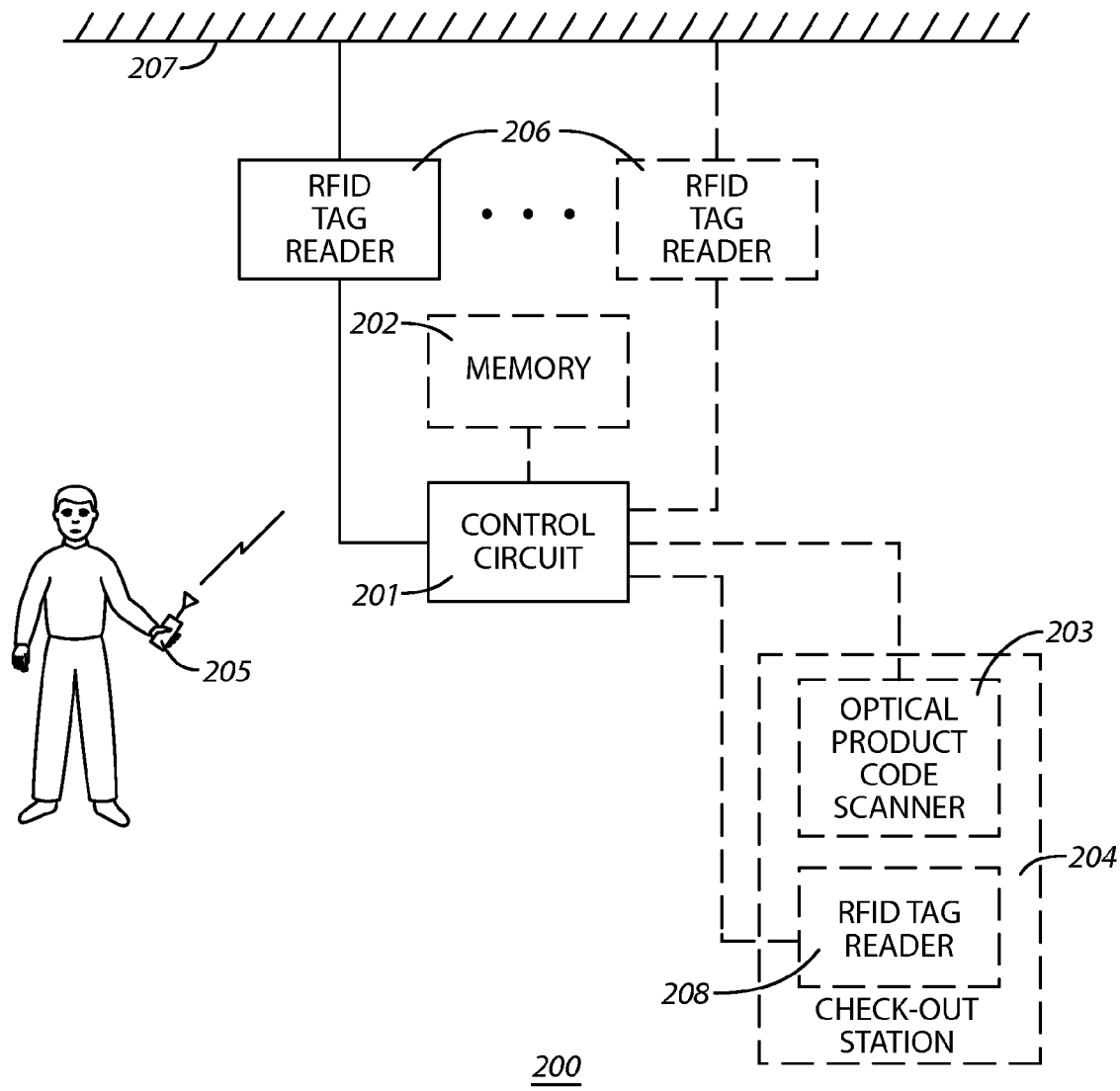
FIG. 2 comprises a block diagram as configured in accordance with various embodiments of this disclosure.

For the sake of an illustrative example but without intending any particular limitations in these regards, it will be presumed here that a control circuit of choice carries out this process 100. FIG. 2 presents an illustrative example in these regards. In this example a given facility 200 includes a control circuit 201. This facility 200 can comprise, for example, a building such as a retail store or the like. The control circuit 201 can comprise a fixed-purpose hard-wired platform or can comprise a partially or wholly programmable platform as desired. These architectural options are well known and understood in the art and require no further description here. This control circuit 201 is configured (for example, by using corresponding programming as will be well understood by those skilled in the art) to carry out one or more of the steps, actions, and/or functions described herein.

By one optional approach, if desired, the control circuit 201 operably couples to a memory 202. This memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Again for the sake of an illustrative example, the control circuit 201 also operably couples to one or more optical product code scanners 203 located, for example, at one or more check-out stations 204 where a customer presents goods to be purchased and where the retailer processes the purchasing transaction. So configured, the control circuit 201 can receive information regarding scanned optical product codes (such as the ubiquitous Universal Product Code (UPC) bar code) as correspond to items being purchased in a given transaction by a consumer.

By one approach, in lieu of the foregoing or in combination therewith, the control circuit 201 receives scanned optical product code information from the customer's personal mobile device 205. For example, many so-called smartphones employ applications that leverage an on-board camera to read optical product codes. Such devices 205 may then convey that information using, for example, any of a variety of near-field and/or short-range wireless communications methodologies to thereby provide that information to the control circuit 201. In this case, for example, the customer can optically scan the items they intend to purchase while shopping (for example, prior to placing these items in a shopping cart) to build a list of scanned optical product codes. That list could then be conveyed to the control circuit 201 as the list is being built and while the customer is still shopping and/or when the customer presents these items at the check-out station 204.

Those skilled in the art will recognize other possibilities in these regards as well. For example, the aforementioned shopping cart (not shown) could itself include a mobile optical code scanner that the customer can use to read the optical codes for items they intend to purchase. That mobile optical code scanner could then convey the corresponding information to the control circuit 201 using, for example, any of a variety of wireless communications methodologies.

In this example the control circuit 201 is also configured to receive information regarding read electronic product codes (such as the aforementioned EPC's). For the sake of an illustrative example, one or more RFID-tag readers 206 that are located other than at the check-out station 204 may serve in these regards. For example, these RFID-tag readers 206 may comprise overhead RFID-tag readers 206 that hang suspended from the ceiling 207 of the facility 200. Examples in such regards can be found, for example, in U.S. patent application Ser. No. 12/900,191, entitled METHOD AND APPARATUS PERTAINING TO RFID TAG READER ANTENNA ARRAY and the contents of which are fully incorporated herein by this reference.

So configured, RFID tags (not shown) as are associated with some or all of the items being gathered by the customer (for example, in their shopping cart) as they shop can be read and that information eventually (if not immediately) conveyed to the control circuit 201. By one approach, the information so conveyed can be derived from aggregating, prior to purchase, the electronic product codes for the items being selected by a given consumer into a recognized group of items that are to be purchased together (to thereby avoid confusing the intended purchases of one consumer with the intended purchases of another consumer as those various groups of items, for example, occasionally become proximal to one another as the consumers move their selected items through the store and near one another). Various approaches in these regards are known in the art and accordingly further elaboration in these regards will not be provided here for the sake of brevity.

Although facility-wide (or at least widely dispersed) RFID-tag readers can be employed if desired, these teachings can also serve in application settings where a less-ambitious approach to RFID-tag reading serves. For example, in lieu of the foregoing or in combination therewith if desired, the aforementioned check-out stations 204 can include check-out station RFID-tag readers 208 to read only RFID tags at, or in the near vicinity of, the check-out station 204.

The foregoing description includes a number of identified optional approaches. It will be further understood that the specifics of that description are intended to serve in an illustrative regard and are not intended to identify or exemplify any particular essential practices or approaches. Instead, those skilled in the art will recognize and understand that the process 100 described below can be enabled using any of a variety of approaches.

Referring now to both FIGS. 1 and 2, at 101 the control circuit 201 accesses information regarding scanned optical product codes as correspond to items being purchased in a given transaction. The scanned optical product codes can be obtained, for example, via one or more corresponding optical product code scanners 102 as described above. Accordingly, these scanned optical product codes can be provided by the consumer themselves and/or facility equipment being operated by associates of, for example, a retail establishment at that facility.

At 103, the control circuit 201 also access information regarding read electronic product codes as correspond to items being purchased in the given transaction. Again, by one approach these read electronic product codes can be obtained from one or more RFID-tag readers 104 as described above. These read electronic product codes can be obtained synchronously with the aforementioned scanned optical product codes if desired but for many application settings it will suffice to receive the read electronic product codes asynchronously with respect to receiving the scanned optical product codes.

When all of the items at the facility 200 have both an optical product code and an electronic product code, it should generally be the case that all of the items being purchased by the consumer at a given time will each be represented by both a corresponding scanned optical product code and a read electronic product code. This preferred state will reflect and evidence that all of the RFID tags for the items and all of the optical product codes for the items have been read/scanned and thus confirm, for example, the thoroughness and veracity of both product code systems at the facility.

To assess the measure of such a preferred state, at 105 the control circuit 201 compares the information regarding the scanned optical product codes with the information regarding the read electronic product codes to identify discrepancies. An example of a discrepancy is an item for which there is a read electronic product code but for which there is not a corresponding scanned optical product code. Another example of a discrepancy is an item for which there is a scanned optical product code but for which there is not a corresponding scanned optical product code.

If desired, the control circuit 201 can provide an immediate alert or other report regarding any such a discrepancy (and/or the lack of such a discrepancy) as regards a given purchasing transaction. That alert/report can serve, for example, to help ensure that the customer is receiving every item that they intend to purchase and/or to help avoid a situation where the individuals attending to the purchasing transaction inadvertently miss charging the customer for an item that the customer will be taking with them when they leave the facility 200.

Figure 3:
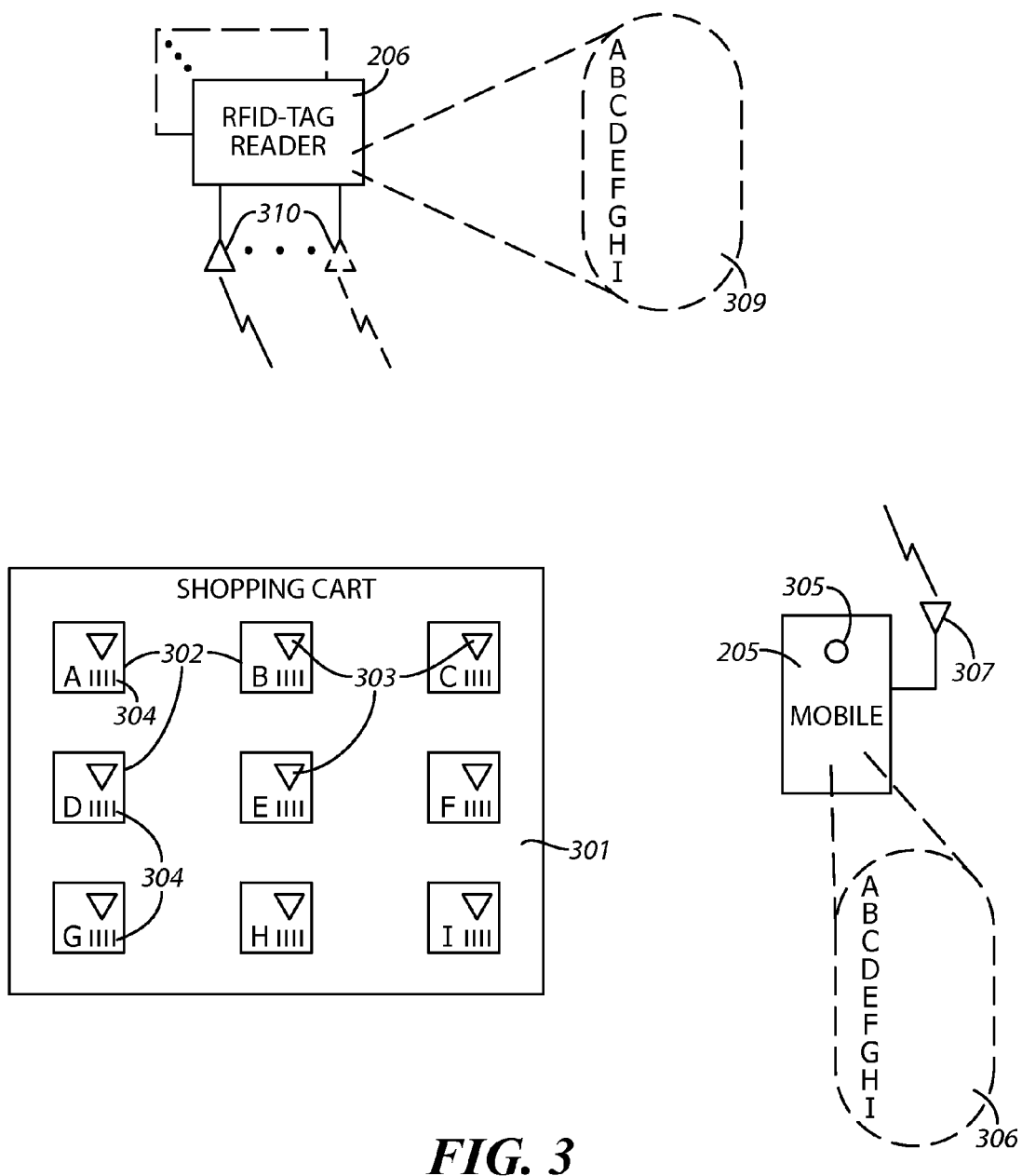
FIG. 3 comprises a block diagram as configured in accordance with various embodiments of this disclosure.

FIG. 3 provides a specific illustrative example in these regards. Again, it will be understood that no particular limitations are intended by way of the particulars of this example.

In this example, the customer at the facility 200 has a shopping cart 301 into which the customer has placed nine items 302 they plan to purchase (these nine items 302 being denoted as item A through item I). Each of these items 302 has a corresponding RFID tag 303 that includes a unique electronic product code by which each item can be uniquely identified. Each item 302 also has a corresponding optical product code 304 that generally identifies the item 302 by one or more product categories (at the least).

In this example the customer employs a mobile device 205 having a camera 305. The customer uses that camera 305 and a corresponding application to scan each optical product code 304 for each item 302. The customer may scan these codes 304, for example, when initially placing each item 302 into the shopping cart 301 or, as another example, in a batch process prior to visiting the check-out station 204. The mobile device 205 maintains a list 306 of these scanned optical product codes 304. As described above, the mobile device 205 also transmits that list 306 (via, for example, a short-range wireless transmitter 307 of choice) directly or indirectly to the control circuit 201.

Somewhat similarly, one or more RFID-tag readers 206 employ one or more RFID tag-reader antennas 310 to read the RFID tags 303 for the items 302 and aggregate the read electronic product codes into a corresponding list 309 for this particular grouping of items 302. And again, as described above, the information in this list 309 is provided to the control circuit 201 via a wireless and/or non-wireless communications path of choice.

Upon comparing the information in these two lists 306 and 309, the control circuit 201 will note a discrepancy. The list 309 of electronic product codes identifies nine unique products whereas the list 306 of optical product codes includes only eight products.

This discrepancy may have occurred for any of a variety of reasons ranging from customer error, equipment error, customer malfeasance, and so forth. The identified discrepancy can serve to prompt an immediate alert and a corresponding inspection or audit of the purchasing transaction if desired and/or can simply be recorded in a transaction history for later processing and study.

The corresponding enterprise can leverage such a history in a variety of ways. By one approach, for example, a customer who repeatedly fails to capture an optical product code for each of their purchase selections (as detected by the aforementioned discrepancy check) may eventually be denied the option to process their purchases using a self-scanning methodology and may instead, for example, be required to use an associate-assisted check-out station.

In any event, such historical information can help the enterprise using these teachings to develop confidence in their RFID-tag readers and the ability of the latter to accurately and comprehensively capture electronic product code information for every item selected by a consumer during a given shopping visit. To the extent that discrepancies in these regards are noted, the enterprise can leverage that information to identify, for example, where improvements to the RFID-tag readers may improve the ability of the overall system to comprehensively capture such information.

These teachings can be similarly applied in application settings where not all of the items available at the facility have a corresponding electronic product code. In such a case, the processes described herein can still be carried out albeit as limited to the items that have both an optical product code and an electronic product code. In such a case, for example, the control circuit 200 can conduct the described discrepancy check in a manner that is limited to items having an electronic product code. As an illustrative example in these regards, if a customer selects ten items to purchase, where only four of those items have a corresponding electronic product code, the control circuit 201 can determine from the scanned optical product codes that four of the items should, in fact, have a corresponding electronic product code. The control circuit 201 can then conduct the discrepancy check as regards those four particular items.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
  by a control circuit:
    accessing information regarding scanned optical product codes as correspond to items being purchased in a given transaction;
    accessing information regarding read electronic product codes as correspond to items being purchased in the given transaction, the read electronic product codes being obtained, at least in part, from overhead radio-frequency identification tag readers;
    comparing the information regarding the scanned optical product codes with the information regarding the read electronic product codes to identify discrepancies.

2. The method of claim 1 wherein the information regarding scanned optical product codes comprises information obtained from a customer's mobile optical product code scanner.

3. The method of claim 1 wherein the information regarding scanned optical product codes comprises information obtained from a check-out station optical product code scanner.

4. The method of claim 1 wherein the information regarding read electronic product codes is obtained solely from overhead radio-frequency identification tag readers.

5. The method of claim 1 wherein the information regarding read electronic product codes is obtained, at least in part, from a check-out station radio-frequency identification tag reader.

6. The method of claim 1 wherein the discrepancies include, at least in part, any item for which there is a read electronic product code but not a corresponding scanned optical product code.

7. The method of claim 1 wherein the information regarding read electronic product codes as correspond to items being purchased in the given transaction is derived from aggregating, prior to purchase, the electronic product codes for the items into a recognized group of items that are to be purchased together.

8. An apparatus comprising:

a control circuit configured to:

- access information regarding scanned optical product codes as correspond to items being purchased in a given transaction;
- access information regarding read electronic product codes as correspond to items being purchased in the given transaction, the read electronic product codes being obtained, at least in part, from overhead radio-frequency identification tag readers;
- compare the information regarding the scanned optical product codes with the information regarding the read electronic product codes to identify discrepancies.

9. The apparatus of claim 8 wherein the information regarding scanned optical product codes comprises information obtained from a customer's mobile optical product code scanner.

10. The apparatus of claim 8 wherein the information regarding scanned optical product codes comprises information obtained from a check-out station optical product code scanner.

11. The apparatus of claim 8 wherein the information regarding read electronic product codes is obtained solely from overhead radio-frequency identification tag readers.

12. The apparatus of claim 8 wherein the information regarding read electronic product codes is obtained, at least in part, from a check-out station radio-frequency identification tag reader.

13. The apparatus of claim 8 wherein the discrepancies include, at least in part, any item for which there is a read electronic product code but not a corresponding scanned optical product code.

14. The apparatus of claim 8 wherein the information regarding read electronic product codes as correspond to items being purchased in the given transaction is derived from aggregating, prior to purchase, the electronic product codes for the items into a recognized group of items that are to be purchased together.

* * * * *